United States Patent
Li et al.

(10) Patent No.: US 11,568,876 B2
(45) Date of Patent: Jan. 31, 2023

(54) METHOD AND DEVICE FOR USER REGISTRATION, AND ELECTRONIC DEVICE

(71) Applicant: BEIJING ORION STAR TECHNOLOGY CO., LTD., Beijing (CN)

(72) Inventors: Fuxiang Li, Beijing (CN); Xiao Li, Beijing (CN); Guoguang Li, Beijing (CN)

(73) Assignee: BEIJING ORION STAR TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 16/603,800

(22) PCT Filed: Apr. 10, 2018

(86) PCT No.: PCT/CN2018/082501
§ 371 (c)(1),
(2) Date: Oct. 8, 2019

(87) PCT Pub. No.: WO2018/188586
PCT Pub. Date: Oct. 18, 2018

(65) Prior Publication Data
US 2021/0110832 A1    Apr. 15, 2021

(30) Foreign Application Priority Data
Apr. 10, 2017    (CN) .......................... 201710229959.6

(51) Int. Cl.
*G10L 17/06* (2013.01)

(52) U.S. Cl.
CPC .................................. *G10L 17/06* (2013.01)

(58) Field of Classification Search
CPC ............ G10L 17/06; G10L 2015/0631; G10L 15/06; G10L 2015/223; G10L 15/22;
(Continued)

(56) References Cited

U.S. PATENT DOCUMENTS 6,246,987 B1 *   6/2001   Fisher ............... H04M 3/42204
                                                            704/247
6,477,499 B1    11/2002   Yasuda
(Continued)

FOREIGN PATENT DOCUMENTS

CN    104123115 A    10/2014
CN    104575504 A    4/2015
(Continued)

OTHER PUBLICATIONS

Second Office Action of the corresponding JP application No. 2019-554957 dated Feb. 24, 2021, 2 pages.
(Continued)

*Primary Examiner* — Huyen X Vo
(74) *Attorney, Agent, or Firm* — Cozen O'Connor

(57) ABSTRACT

Provided in embodiments of the present application are a method and apparatus for user registration and electronic device. The method includes: after obtaining a wake-up voice of a user each time, extracting and storing a first voiceprint feature corresponding to the wake-up voice; clustering the stored first voiceprint features to divide the stored first voiceprint features into at least one category, wherein, each of the at least one category includes at least one first voiceprint feature which belongs to the same user; assigning one category identifier to each category; storing each category identifier in correspondence to at least one first voiceprint feature corresponding to this category iden-
(Continued)

tifier to complete user registration. The embodiments of the present application can simplify the user operation and improve the user experience.

13 Claims, 3 Drawing Sheets

(58) Field of Classification Search
CPC ............... G10L 15/063; G10L 15/1822; G10L 15/18; G10L 15/34; G10L 17/02; G10L 17/14; G10L 17/04; H04L 63/0861; H04L 9/3231; H04L 29/06; H04L 65/1073; H04L 61/00; H04L 9/40
See application file for complete search history.

(56) References Cited

U.S. PATENT DOCUMENTS

| | | | |
|---|---|---|---|
| 9,697,828 B1* | 7/2017 | Prasad | G10L 15/18 |
| 2006/0020457 A1* | 1/2006 | Tripp | G10L 17/00 |
| | | | 704/246 |
| 2008/0091425 A1* | 4/2008 | Kane | G10L 17/04 |
| | | | 704/246 |
| 2015/0025887 A1* | 1/2015 | Sidi | G10L 17/04 |
| | | | 704/245 |
| 2016/0035349 A1 | 2/2016 | Jung et al. | |
| 2016/0283185 A1* | 9/2016 | McLaren | G06F 16/60 |
| 2017/0125024 A1* | 5/2017 | Sundararajan | G10L 25/15 |
| 2017/0160813 A1* | 6/2017 | Divakaran | G06K 9/00335 |
| 2018/0108351 A1* | 4/2018 | Beckhardt | G06F 3/165 |
| 2018/0166067 A1* | 6/2018 | Dimitriadis | G10L 15/04 |

FOREIGN PATENT DOCUMENTS

| | | |
|---|---|---|
| CN | 105096940 A | 11/2015 |
| CN | 105511608 A | 4/2016 |
| CN | 106228988 A | 12/2016 |
| CN | 106295299 A | 1/2017 |
| CN | 106375336 A | 2/2017 |
| CN | 106506524 A | 3/2017 |
| CN | 107147618 A | 9/2017 |
| JP | 2005078072 A | 3/2005 |
| JP | 2011175587 A | 3/2011 |
| JP | 2015516091 A | 6/2015 |
| WO | 2014155652 A1 | 10/2014 |
| WO | 2016022588 A1 | 2/2016 |
| WO | 2016054991 A1 | 4/2016 |
| WO | 2016/129930 A1 | 8/2016 |

OTHER PUBLICATIONS

International Search Report for PCT/CN2018/082501, dated Jul. 3, 2018, 6 pages (including English translation).
Communication Pursuant to Article 94(3) EPC in European Application No. 1878474.8 dated Dec. 16, 2021, 5 pages.

* cited by examiner

METHOD AND DEVICE FOR USER REGISTRATION, AND ELECTRONIC DEVICE

The present application claims the priority to a Chinese Patent Application No. 201710229959.6, filed with the China National Intellectual Property Administration on Apr. 10, 2017 and entitled "Method and apparatus for user registration and electronic device", which is incorporated into the present application by reference in its entirety.

TECHNICAL FIELD

The present application relates to the field of intelligent device technology, and in particular, to a method and apparatus for user registration and electronic device.

BACKGROUND

At present, an intelligent device usually performs a user identification process, that is, has a user identification function. The user identification process may include fingerprint identification, voice identification, face identification, or the like.

A user needs to register its fingerprint, voice or face on an intelligent device in advance, before using the intelligent device. In this way, when the user uses the intelligent device later, the intelligent device may identify the user.

In the existing voice-based user registration process, the user firstly continuously sends multiple wake-up voices to the intelligent device, and then the intelligent device extracts and records a voiceprint feature of each of the wake-up voices, and the user inputs a username for the voiceprint features into the intelligent device to complete the registration.

Hereafter, when a user sends a wake-up voice to the intelligent device, the intelligent device extracts a voiceprint feature of the wake-up voice. If the voiceprint feature is similar to a voiceprint feature corresponding to a previously recorded username, the intelligent device may identify the user sending the wake-up voice.

In the existing voice-based user registration process, the intelligent device can identify a user sending a wake-up voice only after the user continuously sends multiple wake-up voices to the intelligent device and inputs a username into the intelligent device to complete registration, which is relatively complicated for the user and thus provides a relatively poor user experience.

SUMMARY

The object of the present application is to provide a method and apparatus for user registration and electronic device to simplify the user operation and improve the user experience.

To achieve the above object, an embodiment of the present application provides a method for user registration, which is applied to an electronic device. The method comprises:

after obtaining a wake-up voice of a user each time, extracting and storing a first voiceprint feature corresponding to the wake-up voice;

clustering the stored first voiceprint features to divide the stored first voiceprint features into at least one category, wherein, each of the at least one category comprises at least one first voiceprint feature, which belongs to the same user;

assigning one category identifier to each of the at least one category; and storing each category identifier in correspondence to at least one first voiceprint feature corresponding to this category identifier to complete user registration.

Optionally, clustering the stored first voiceprint features to divide the stored first voiceprint features into at least one category, comprises:

calculating a similarity between every two of the stored first voiceprint features by a clustering algorithm; and dividing all of the first voiceprint features into at least one category based on the calculated similarities.

Optionally, the method further comprises:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type.

Optionally, determining a service type corresponding to the service instruction voice comprises:

identifying the service instruction voice to obtain service instruction voice identification information;

performing semantic analysis on the service instruction voice identification information; and determining the service type corresponding to the service instruction voice based on a result of the semantic analysis.

Optionally, the method further comprises:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

Optionally, the method further comprises:

outputting a request for requesting a first user identifier based on the identified target category identifier;

receiving first voice information fed back by the user, and performing voice identification on the first voice information to obtain first voice identification information;

determining the first voice identification information as the first user identifier; and recording a correspondence between the first user identifier and the target category identifier.

Optionally, the method further comprises:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

Optionally, the electronic device is an intelligent device; and the method further comprises:

obtaining the wake-up voice of the user by:

detecting voice information in real time;

after detecting voice information input by a user, when a silence duration reaches a preset voice pause duration, determining the voice information input by the user as target to-be-identified voice information;

performing voice identification on the target to-be-identified voice information to obtain target voice identification information; and when the target voice identification information is the same as a preset wake-up word, determining the target to-be-identified voice information as the wake-up voice.

Optionally, the electronic device is a cloud server that is communicatively connected to the intelligent device;

the method further comprises:

obtaining the wake-up voice of the user by:

receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

An embodiment of the present application further provides an apparatus for user registration, which is applied to an electronic device. The apparatus comprises:

a first extraction module, configured for, after obtaining a wake-up voice of a user each time, extracting and storing a first voiceprint feature corresponding to the wake-up voice;

a clustering module, configured for clustering the stored first voiceprint features to divide the stored first voiceprint features into at least one category, wherein, each of the at least one category comprises at least one first voiceprint feature, which belongs to the same user;

an assignment module, configured for assigning one category identifier to each of the at least one category; and a first storage module, configured for storing each category identifier in correspondence to at least one first voiceprint feature corresponding to this category identifier to complete user registration.

Optionally, the clustering module includes:

a calculation unit, configured for calculating a similarity between every two of the stored first voiceprint features by a clustering algorithm;

a division unit, configured for dividing all of the first voiceprint features into at least one category based on the calculated similarities.

Optionally, the apparatus further comprises:

a second extraction module, configured for, after obtaining a service instruction voice of a user each time, extracting and storing a second voiceprint feature corresponding to the service instruction voice;

a first determination module, configured for determining a service type corresponding to the service instruction voice;

a first matching module, configured for matching the second voiceprint feature with each first voiceprint feature in each of the at least one category; and a second storage module, configured for storing a category identifier of a successfully matched first voiceprint feature in correspondence to this service type.

Optionally, the first determination module comprises:

a first identification unit, configured for identifying the service instruction voice to obtain service instruction voice identification information;

an analysis unit, configured for performing semantic analysis on the service instruction voice identification information; and a first determination unit, configured for determining the service type corresponding to the service instruction voice based on a result of the semantic analysis.

Optionally, the apparatus further comprises:

a second determination module, configured for, after extracting the first voiceprint feature corresponding to the wake-up voice, determining the first voiceprint feature corresponding to the wake-up voice as a to-be-identified voiceprint feature;

a second matching module, configured for matching the to-be-identified voiceprint feature with each first voiceprint feature in each of the at least one category;

a third determination module, configured for determining a category identifier corresponding to a successfully matched first voiceprint feature as a target category identifier;

a judgment module, configured for determining whether a service type that is stored in correspondence to the target category identifier exists; and a first output module, configured for, when the judgment module determines that a service type that is stored in correspondence to the target category identifier exists, outputting service prompt information corresponding to the stored service type.

Optionally, the apparatus further comprises:

a second output module, configured for outputting a request for requesting a first user identifier based on the identified target category identifier;

a first identification module, configured for receiving first voice information fed back by the user for the request for requesting the first user identifier, and performing voice identification on the first voice information to obtain first voice identification information;

a fourth determination module, configured for determining the first voice identification information as the first user identifier; and a record module, configured for recording a correspondence between the first user identifier and the target category identifier.

Optionally, the apparatus further comprises:

a second output module, configured for, after obtaining a user registration instruction, acquiring a wake-up voice sample for N times in succession to obtain N wake-up voice samples, and outputting a request for requesting a second user identifier, wherein, N is an integer greater than 1;

a second identification module, configured for receiving voice information fed back by the user for the request for requesting the second user identifier, and performing voice identification on the voice information to obtain voice identification information corresponding to the voice information;

a third storage module, configured for determining the voice identification information as the second user identifier, and storing the second user identifier in correspondence to voiceprint features of the obtained N wake-up voice samples, respectively.

Optionally, the electronic device is an intelligent device; and the apparatus further comprises:

a first obtaining module, configured for obtaining the wake-up voice of the user; wherein, the first obtaining module comprises:

a detection unit, configured for detecting voice information in real time;

a second determination unit, configured for, after detecting voice information input by a user, when a silence duration reaches a preset voice pause duration, determining the voice information input by the user as target to-be-identified voice information;

a second identification unit, configured for performing voice identification on the target to-be-identified voice information to obtain target voice identification information; and a third determination unit, configured for, when the target voice identification information is the same as a preset wake-up word, determining the target to-be-identified voice information as the wake-up voice.

Optionally, the electronic device is a cloud server that is communicatively connected to the intelligent device;

the apparatus further comprises:

a first obtaining module, configured for obtaining the wake-up voice of the user; wherein, the first obtaining module is further configured for receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

An embodiment of the present application provides an electronic device. The electronic device includes: a housing, a processor, a memory, a circuit board and a power circuit; wherein, the circuit board is arranged inside space surrounded by the housing; the processor and the memory are arranged on the circuit board; the power circuit supplies power to each of circuits or components of the electronic device; the memory stores executable program codes; the processor executes a program corresponding to the executable program codes by reading the executable program codes stored in the memory, so as to perform the above method for user registration.

An embodiment of the present application further provides a computer readable storage medium for storing a computer program therein, wherein, the computer program, when being executed by a processor, causes the processor to perform the above method for user registration.

An embodiment of the present application further provides an application program which, when being executed, performs the above method for user registration.

Embodiments of the present application provide a method for user registration, apparatus and electronic device. After a wake-up voice is received each time, a voiceprint feature is extracted and stored; the stored voiceprint features are clustered to divide the voiceprint features into at least one category, wherein each of the at least one category comprises at least one voiceprint feature, which belongs to the same user; one category identifier is assigned to each of the at least one category; each category identifier is stored in correspondence to at least one voiceprint feature corresponding to this category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions in the embodiments of the present application will be described clearly and completely below in combination with the accompanying drawings. Obviously, the described embodiments are only some, and not all, of the embodiments of the present application. All other embodiments obtained based on the embodiments of the present application by those skilled in the art without any creative efforts fall into the scope of protection defined by the present application.

To achieve the above object, an embodiment of the present application provides a method for user registration, which may be applied to an electronic device. The electronic device may be an intelligent device or a cloud server communicatively connected to the intelligent device. In the embodiment of the present application, the intelligent device may be a device with a voice identification function, such as an intelligent phone, an intelligent speaker, an intelligent robot, an intelligent tablet or the like.

Figure 1:
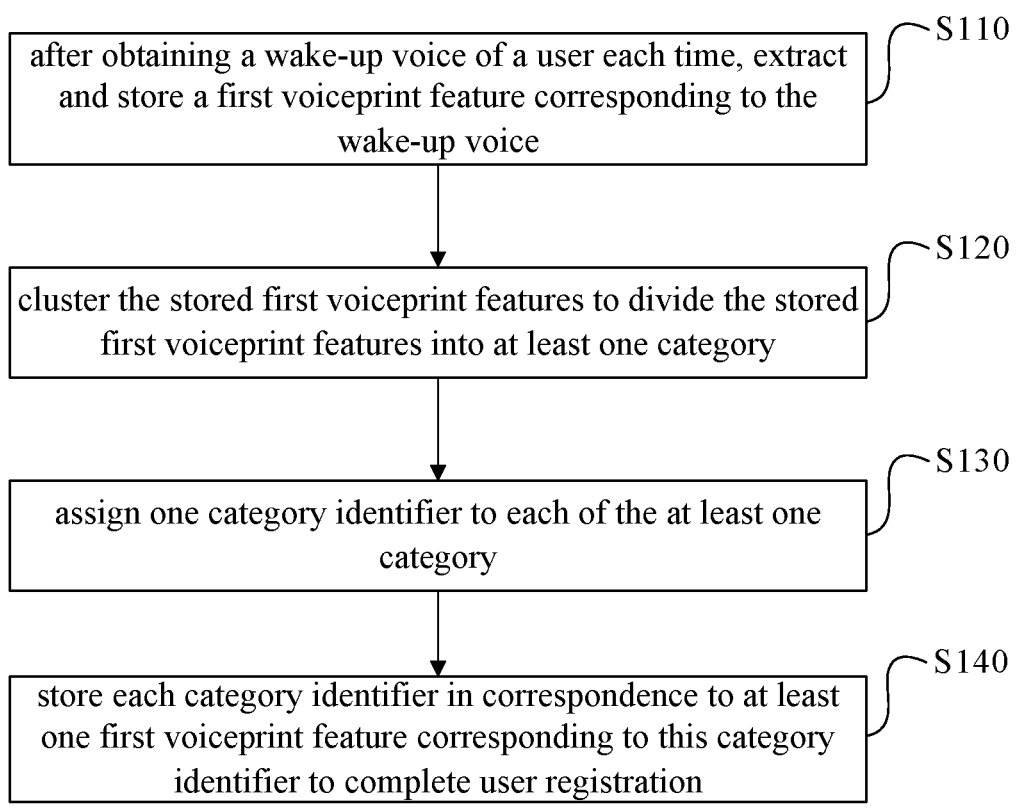
FIG. 1 is a flowchart of a method for user registration according to an embodiment of the present application.

FIG. 1 is a flowchart of a method for user registration according to an embodiment of the present application. The method includes steps S110 to S140.

At S110, after a wake-up voice of a user is obtained each time, a first voiceprint feature corresponding to the wake-up voice is extracted and stored.

In this embodiment, an electronic device may be applied in a household scenario. There is at least one user in the household scenario. The at least one user uses the electronic device over a long period of time. Each time when any of the at least one user wakes up the electronic device, the electronic device acquires a wake-up voice, and extracts and stores a first voiceprint feature corresponding to the wake-up voice. The voiceprint feature is extracted by the prior art.

In one implementation of the embodiment of the present application, the electronic device is an intelligent device.

The intelligent device obtains a wake-up voice of a user by:

detecting voice information in real time; after detecting voice information input by a user, when a silence duration reaches a preset voice pause duration, determining the voice information input by the user as to-be-identified voice information; performing voice identification on the target to-be-identified voice information to obtain target voice identification information; when the target voice identification information is the same as a preset wake-up word, determining the target to-be-identified voice information as the wake-up voice.

Specifically, the intelligent device in operation detects voice information surrounding the intelligent device in real time. At an initial moment, the volume of the surrounding sound is relatively low, and the intelligent device is in silence phase. When suddenly detecting the volume of sound greater than a certain preset value, the intelligent device can determine that a user currently inputs voice information. At this time, the intelligent device enters a voice phase, and captures the voice information in the voice phase. After a period of time in the voice phase, the volume of the sound is lower than a preset value, and thus the intelligent device enters the silence phase again. When the duration of the silence phase reaches the preset voice pause duration, the intelligent device determines the voice information input by the user, that is, the captured voice information, as the target to-be-identified voice information. In this embodiment, the preset voice pause duration may be freely set. The preset voice pause duration is preferably 500 milliseconds.

Hereafter, the intelligent device performs voice identification on the target to-be-identified voice information to obtain target voice identification information, and then matches the target voice identification information with the preset wake-up word. When the target voice identification information matches the preset wake-up word, for example, when the target voice identification information is the same as the preset wake-up word, the intelligent device may determine that the to-be-identified voice information is the wake-up voice.

In another implementation of the embodiment of the present application, when the electronic device is a cloud server that is communicatively connected to the intelligent device, a wake-up voice of a user is obtained by:

receiving a wake-up voice sent by the intelligent device; wherein, after detecting voice information input by the user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

Specifically, the intelligent device detects voice information surrounding the intelligent device in real time. At an initial moment, the volume of the surrounding sound is relatively low, and the intelligent device is in silence phase. When suddenly detecting the volume of sound greater than a certain preset value, the intelligent device can determine that a user currently inputs voice information. At this time, the intelligent device enters a voice phase, and captures the voice information in the voice phase. After a period of time in the voice phase, the volume of the sound is lower than a preset value, and thus the intelligent device enters the silence phase again. When the duration of the silence phase reaches the preset voice pause duration, the intelligent device determines the voice information input by the user, that is, the captured voice information, as the target to-be-identified voice information. Hereafter, the intelligent device performs voice identification on the target to-be-identified voice information to obtain target voice identification information, and then matches the target voice identification information with the preset wake-up word. When the target voice identification information matches the preset wake-up word, for example, when the target voice identification information is the same as the preset wake-up word, the intelligent device may determine that the to-be-identified voice information is the wake-up voice. The cloud server obtains the wake-up voice of the user.

At S120, the stored first voiceprint features are clustered to divide the stored first voiceprint features into at least one category, wherein, each of the at least one category comprises at least one first voiceprint feature, which belongs to the same user.

In an implementation of the embodiment of the present application, the step S120 includes A1-A2.

At A1, a similarity between every two of the stored first voiceprint features is calculated by a clustering algorithm.

Specifically, a similarity weight of each of to-be-matched attributes may be preset by the clustering algorithm. The attributes may include a vibration frequency, a vibration period and amplitude of a sound wave spectrum, and the like. During the matching of any two of the stored first voiceprint features, the higher a similarity weight of a certain attribute is, the more similar this attribute of one of the two stored first voiceprint features and this attribute of the other of the two stored first voiceprint features are. Finally, similarity weights of all attributes are superposed to obtain the similarity. The similarity indicates the combination of similarity weights of all attributes of the two stored first voiceprint features. The higher the similarity is, the more likely the two stored first voiceprint features belong to the same category.

At A2, all of the first voiceprint features are divided into at least one category base on the obtained similarities.

Specifically, a similarity threshold may be preset. After the similarity between every two of the stored first voiceprint features is calculated, two stored first voiceprint features whose similarity is higher than the similarity threshold may be the same category, and two stored first voiceprint features whose similarity is lower than the similarity threshold are different categories. In this way, all of the stored first voiceprint features may be divided into at least one category. Optionally, the similarity threshold may be freely set based on actual conditions.

In this embodiment, since first voiceprint features of the wake-up voices sent by different users are different, the stored first voiceprint features may be divided into at least one category by calculating a similarity between every two of the stored first voiceprint features through a clustering algorithm, and categorizing all of the stored first voiceprints. A first voiceprint feature(s) in each of the least one category belongs to the same user.

At S130, one category identifier is assigned to each of the at least one category.

At S140, each category identifier is stored in correspondence to at least one first voiceprint feature corresponding to this category identifier to complete the user registration.

Specifically, after obtaining various categories of first voiceprint features, the electronic device assigns one category identifier to each of the categories, that is, at least one first voiceprint feature in each of the categories is associated with a category identifier of this category. Then, the electronic device stores each of category identifiers in correspondence to at least one first voiceprint feature corresponding to this category identifier, so that a first voiceprint feature(s) of one user corresponds to one category identifier.

For example, the electronic device obtains a first voiceprint feature a1, a first voiceprint feature a2 and a first voiceprint feature a3 of a user Ya, a first voiceprint feature b1 and a first voiceprint feature b2 of a user Yb, and a first voiceprint feature c1 of a user Yc. The electronic device obtains three categories of first voiceprint features by the clustering algorithm and assigns category identifiers A, B and C to the categories, respectively. Then the electronic device stores the first voiceprint feature a1, the first voiceprint feature a2 and the first voiceprint feature a3 in correspondence to the category identifier A, stores the first voiceprint feature b1 and the first voiceprint feature b2 in correspondence to the category identifier B, and stores the first voiceprint feature c1 in correspondence to the category identifier C. Therefore, the user Ya, the user Yb and the user Yc correspond to the category identifiers A, B and C, respectively.

In this embodiment, a first voiceprint feature(s) of one user corresponds to one category identifier, that is, one user corresponds to one category identifier, so the invisible registration of the user may be implemented.

In the method for user registration according to the embodiment of the present application, after a wake-up voice of a user is obtained each time, a first voiceprint feature corresponding to the wake-up voice is extracted and stored; the stored first voiceprint features are clustered to divide the stored first voiceprint features into at least one category, wherein, each of the at least one category comprises at least one first voiceprint feature, which belongs to the same user; one category identifier is assigned to each category; each category identifier is stored in correspondence to at least one voiceprint feature corresponding to this category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

Figure 2:
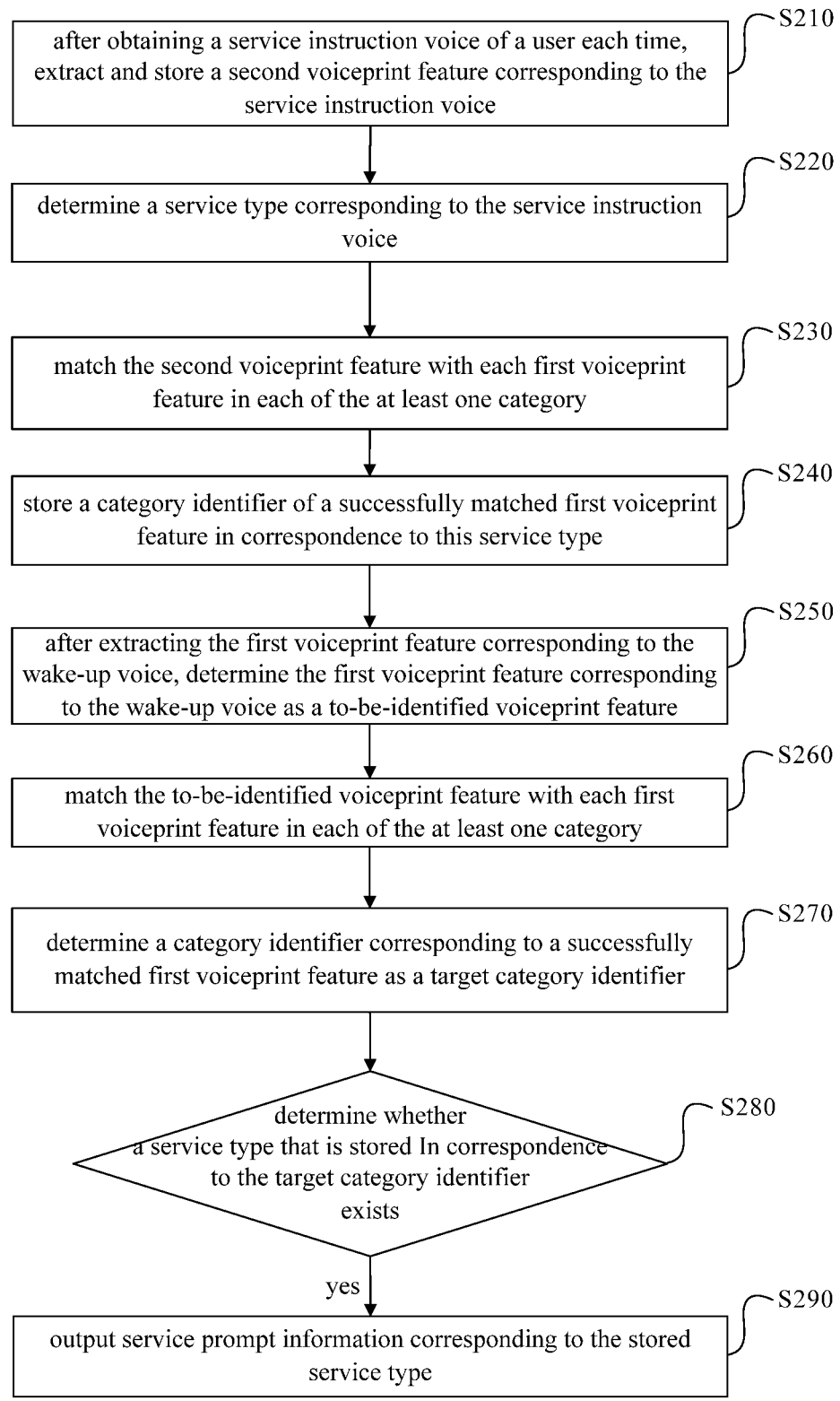
FIG. 2 is a flowchart of sending service prompt information to a user based on a service instruction voice according to an embodiment of the present application.

Optionally, the electronic device may further send service prompt information to the user based on an obtained service instruction voice. FIG. 2 is a flowchart of sending service prompt information to a user based on a service instruction voice according to an embodiment of the present application, which includes S210-S290.

At S210, after a service instruction voice of a user is obtained each time, a second voiceprint feature corresponding to the service instruction voice is extracted and stored.

In this embodiment, the service instruction voice refers to an instruction voice, sent by the user, with a service request. For example, the service instruction voice may be "I want to listen to Jay Chou's 'Breezes into pieces'.", "What is the weather today.", "Tell me a joke." and so on.

Specifically, after any user which uses the electronic device over a long period of time sends a service instruction voice to the electronic device each time, the electronic device will obtain the service instruction voice, and the electronic device extracts and stores the second voiceprint feature corresponding to the service instruction voice.

At S220, a service type corresponding to the service instruction voice is determined.

In an implementation of the embodiment of the present application, the step S220 may include steps A1-A3.

At A1, the service instruction voice is identified to obtain service instruction voice identification information.

Specifically, the electronic device performs voice identification on the received service instruction voice to obtain the service instruction voice identification information. In this embodiment, the voice identification is performed by an existing technology, and will be not described in detail herein.

At A2, semantic analysis is performed on the service instruction voice identification information.

Specifically, the electronic device performs semantic analysis the obtained service instruction voice identification information to obtain an analysis result. In this embodiment, the semantic analysis may be an existing process such as word segmentation, stop word filtering and so on, which will be not described in detail herein.

At A3, the service type corresponding to the service instruction voice is determined based on a result of the semantic analysis.

Specifically, the electronic device may match the result of the semantic analysis with multiple preset service instruction sentence models, to obtain the service type of the service included in the result of the semantic analysis. For example, the preset service instruction sentence models may be "I want to listen to +a song name", "weather", "storytelling", and the like.

For example, if the result of the semantic analysis is "I want to listen to +Forget Love Potion", the result of the semantic analysis matches a preset service instruction sentence model "I want to listen to +a song name", and thus it can be determined that the service type corresponding to the service "Forget Love Potion" included in the service instruction voice is a song.

For another example, if the result of the semantic analysis is "weather", the result of the semantic analysis matches a preset service instruction sentence model "weather", and thus it can be determined that the service type corresponding to the service "weather" included in the service instruction voice is weather forecast.

At S230, the second voiceprint feature is matched with each first voiceprint feature in each category.

Specifically, after obtaining the second voiceprint feature, the electronic device matches the second voiceprint feature with each first voiceprint feature in each category. In this embodiment, the specific matching process may include: calculating the similarity between the second voiceprint feature and each first voiceprint feature, and when the similarity reaches the similarity threshold, determining that the second voiceprint feature successfully matches this first voiceprint feature. The specific process may refer to the process described in step S120.

At S240, a category identifier of a successfully matched first voiceprint feature is stored in correspondence to the service type.

Specifically, if the second voiceprint feature successfully matches a certain first voiceprint feature, it indicates that the user who sends the service instruction voice corresponding to the second voiceprint feature is the user who sends the wake-up voice corresponding to this first voiceprint feature.

At this time, the electronic device stores the category identifier of the successfully matched first voiceprint feature in correspondence to the service type. It should be noted that, since the same user may request multiple service types, such as a song, a video or a crosstalk, the category identifier of the successfully matched first voiceprint feature may be stored in correspondence to multiple service types.

For example, the second voiceprint feature successfully matches the first voiceprint feature b2, and the user who sends the wake-up voice corresponding to the first voiceprint feature b2 is the user Yb. Thus, the user who sends the service instruction voice corresponding to the second voiceprint feature is the user Yb. The service type corresponding to the second voiceprint feature is "a song", and the category identifier corresponding to the first voiceprint feature b2 is B. Therefore, the electronic device may store the category identifier B of the first voiceprint feature in correspondence to the service type "a song".

In this embodiment, it is possible to determine the correspondence between the category identifier and the service type by matching the voiceprint feature of the service instruction voice with the voiceprint feature of the wake-up voice, and thus obtain the correspondence between the user and the service type.

It should be noted that, the steps S210-S220 may be performed once after a service instruction voice of a user is obtained each time. Alternatively, after a service instruction voice of a user is obtained each time, the service instruction voice is stored, and the number of times of obtaining a service instruction voice is recorded; when the recorded number of times reaches a preset number of times, the steps S210-S220 are performed based on the obtained service instruction voices.

At S250, after a first voiceprint feature corresponding to a wake-up voice is extracted, the first voiceprint feature corresponding to the wake-up voice is determined as a to-be-identified voiceprint feature.

Specifically, when the user sends a wake-up voice to the electronic device again, the electronic device extracts a first voiceprint feature corresponding to the wake-up voice and determines the first voiceprint feature as the to-be-identified voiceprint feature.

At S260, the to-be-identified voiceprint feature is matched with each first voiceprint feature in each category.

Specifically, after obtaining the to-be-identified voiceprint feature, the electronic device matches the to-be-identified voiceprint feature with each first voiceprint feature in each category. In this embodiment, the specific matching process may include: calculating the similarity between the to-be-identified voiceprint feature and each first voiceprint feature, and when the similarity reaches the similarity threshold, determining that the to-be-identified voiceprint feature successfully matches this first voiceprint feature. The specific process may refer to the process described in step S120.

At S270, a category identifier corresponding to a successfully matched first voiceprint feature is determined as a target category identifier.

At S280, it is determined whether a service type that is stored in correspondence to the target category identifier exists; if a service type that is stored in correspondence to the target category identifier exists; step S290 is performed; if no service type that is stored in correspondence to the target category identifier exists, the outputting of service prompt information fails.

Specifically, the electronic device determines a category identifier corresponding to the successfully matched first voiceprint feature, as the target category identifier, and determines whether a service type that is stored in correspondence to the target category identifier exists.

At S290, service prompt information corresponding to the stored service type is output.

Specifically, if a service type that is stored in correspondence to the target category identifier exists, the electronic device determines the service type and outputs service prompt information corresponding to the service type. If no service type that is stored in correspondence to the target category identifier exists, the outputting of service prompt information fails. At this time, the electronic device may output failure prompt information to prompt the user that the outputting of the service prompt information fails. For example, the electronic device may output voice information of "The corresponding service is not found.", "Please say it again." and the like. The service prompt information may be "Do you want to listen to a song?", "Do you want to listen to a crosstalk?", or the like.

For example, if the target category identifier is B, and there is a service type "a song" that is stored in correspondence to the target category identifier, the electronic device may output the service prompt information of "Do you want to listen to a song?". For another example, if there is no service type that is stored in correspondence with the target category identifier, the electronic device may output failure prompt information of "Please say it again.".

In this embodiment, service prompt information is sent to the user by obtaining a service instruction voice sent by the user, thereby improving the user experience and making the electronic device more intelligent.

Optionally, the electronic device may also recommend for a user the service of the service type that is frequently requested by the user, by outputting the service prompt information.

Specifically, for each category identifier, the electronic device may record service types of services that have been used by a user in a preset time, such as one week or one month, determine a service type of a service with a maximum number of times of use as the recommended service type after each wake-up of the electronic device, and output corresponding service prompt information.

For example, a user uses a service whose service type is a song for 10 times and only uses a service whose service type is a crosstalk once, within one day. Therefore, the electronic device can determine that the recommended service after each wake-up of the electronic device is a song, to output the corresponding service prompt information, such as "Do you want to listen to Ice Rain?".

In fact, a service with the maximum number of times of use is a service to which the user is accustomed. In this embodiment, the electronic device can recommend a service corresponding to a service type for a user based on the usage habit of the user, thereby further improving the user experience.

Therefore, in this embodiment, by obtaining the habit of the user requesting the service, the corresponding service is provided to the user, thereby improving the user experience, and making the electronic device more intelligent.

Optionally, the electronic device may determine, based on a wake-up voice sent by the user, a category identifier of a voiceprint feature of the wake-up voice. In order to further learn the user who sends the first wake-up voice based on the category identifier to make the whole system more intelligent, the method further includes B1-B4.

At B1, a request for requesting a first user identifier is output based on the identified target category identifier.

In this embodiment, the first user identifier may be a name of a user, such as Xiao Ming, a code of a user, such as 001, or an appellation of a user, such as a father or a mother.

Specifically, after identifying the target category identifier, the electronic device may output a request for requesting a first user identifier, and may output the request through voice information. For example, the request may be "May I know your name, please".

Optionally, after obtaining a preset number of first voiceprint features of the same category identifier, the electronic device may output a request for requesting a first user identifier. For example, when the electronic device receives 20 first voiceprint features of the same category identifier, the electronic device may send a request of "We have known each other for so long, but I still don't know your name?".

At B2, first voice information, which is fed back by the user for the request for requesting the first user identifier, is received, and voice identification is performed on the first voice information to obtain first voice identification information.

Specifically, when the user hears the request for requesting the first user identifier output by the electronic device, the user will say the first voice information including the first user identifier, such as the name of the first user. The electronic device receives the first voice information, and performs the voice identification on the first voice information to obtain the corresponding first voice identification information.

At B3, the first voice identification information is determined as the first user identifier.

At B4, a correspondence between the first user identifier and the target category identifier is recorded.

Specifically, the electronic device determines the identified first voice identification information as the first user identifier, and records a correspondence between the first user identifier and the target category identifier.

In this way, the electronic device establishes a correspondence between the first user identifier and the target category identifier. Since the target category identifier corresponds to the first voiceprint feature, the electronic device establishes a correspondence between the first user identifier and the first voiceprint feature. Further, after receiving a wake-up voice of the user again, the electronic device may determine the first user identifier of the user based on the first voiceprint feature of the wake-up voice.

In this embodiment, after receiving a wake-up voice of the user again, the electronic device may obtain the first user identifier corresponding to the wake-up voice, and output voice information with the first user identifier. If the first user identifier is Xiao Ming, the electronic device may output the voice information of "Hello, Xiao Ming.". Therefore, the whole electronic device is more intelligent and the user experience is improved.

Optionally, in order to adapt to the usage habits of different users, the embodiment of the present application further provides another user registration process, which specifically includes C1-C3.

At C1, after a user registration instruction is obtained, a wake-up voice sample is acquired for N times in succession to obtain N wake-up voice samples, and a request for requesting a second user identifier is output; wherein, N is an integer greater than 1.

In this embodiment, the user registration instruction is an instruction, preset in the electronic device, for starting the user registration process. After the user sends a voice with a user registration instruction, the electronic device enters an operation state of the user registration. For example, the user registration instruction may be "I want to register", "I wanna register", "registering", and the like.

The second user identifier may be a name of a user, such as Xiao Ming, a code of a user, such as 001, or an appellation of a user, such as a father or a mother. N may be an integer greater than 1, such as 3, 4 or 5.

Specifically, after the electronic device obtains the user registration instruction, the user sends a wake-up voice to the electronic device for N times in succession. The electronic device takes the received N wake-up voices as N wake-up voice samples, and sends a request for requesting the second user identifier to the user.

At C2, voice information, which is fed back by the user for the request for requesting the second user identifier, is received, and voice identification is performed on the voice information to obtain voice identification information corresponding to the voice information.

Specifically, when the user hears the request for requesting the second user identifier output by the electronic device, the user will say the voice information including the second user identifier, such as the name of the user. The electronic device receives the voice information, and performs voice identification on the voice information to obtain the corresponding voice identification information.

At C3, the voice identification information is determined as the second user identifier, and the second user identifier is stored in correspondence to voiceprint features of the obtained N wake-up voice samples, respectively.

Specifically, the electronic device determines the voice identification information as the second user identifier, and stores the second user identifier in correspondence to the voiceprint features of the N wake-up voice samples, respectively, to complete the user registration. After obtaining a wake-up voice sent by the user again, the electronic device extracts a voiceprint feature of the wake-up voice, and matches the voiceprint feature with a voiceprint feature of each of the wake-up voice samples. The electronic device may obtain the user who sends the wake-up voice, based on the second user identifier corresponding to the successfully matched voiceprint feature.

That is to say, in this embodiment, the process shown in FIG. 1 may be used for the invisible registration, and the steps C1~C3 described above may be used for the conventional registration. Therefore, the present embodiment may adapt to the usage habits of different users, further improving the user experience, and increasing the intelligence of the electronic device.

Figure 3:
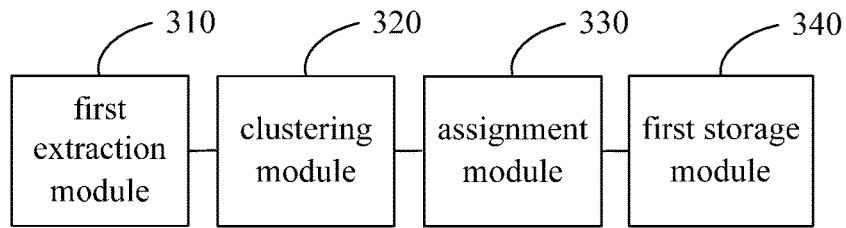
FIG. 3 is a first structural diagram of an apparatus for user registration according to an embodiment of the present application.

Corresponding to the embodiment of the method, an embodiment of the present application further provides an apparatus for user registration, which is applicable to an electronic device. FIG. 3 is a first structural diagram of an apparatus for user registration according to an embodiment of the present application. The apparatus includes:

a first extraction module 310, configured for, after obtaining a wake-up voice of a user each time, extracting and storing a first voiceprint feature corresponding to the wake-up voice;

a clustering module 320, configured for clustering the stored first voiceprint features to divide the stored first voiceprint features into at least one category, wherein, each of the at least one category includes at least one first voiceprint feature, which belongs to the same user;

an assignment module 330, configured for assigning one category identifier to each of the at least one category;

a first storage module 340, configured for storing each category identifier in correspondence to at least one first voiceprint feature corresponding to this category identifier to complete user registration.

The apparatus for user registration according to the embodiment of the present application, after obtaining a wake-up voice of a user each time, extracts and stores a first voiceprint feature corresponding to the wake-up voice. The apparatus for user registration clusters the stored first voiceprint features to divide the stored first voiceprint features into at least one category, wherein, each of the at least one category includes at least one first voiceprint feature, which belongs to the same user. The apparatus for user registration assigns one category identifier to each of the at least one category. The apparatus for user registration stores each category identifier in correspondence to at least one voiceprint feature corresponding to this category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

Further, the clustering module 320 includes:

a calculation unit, configured for calculating a similarity between every two of the stored first voiceprint features by a clustering algorithm;

a division unit, configured for dividing all of the first voiceprint features into at least one category based on the calculated similarities.

Figure 4:
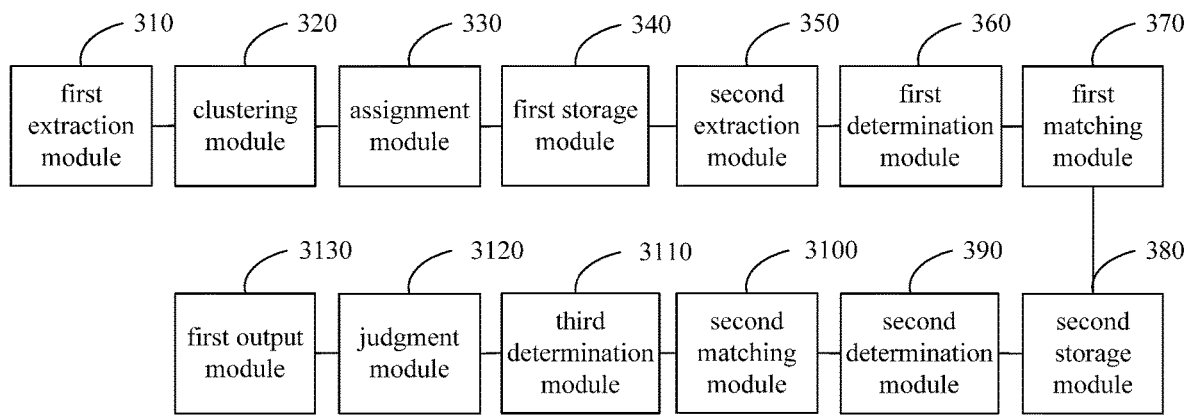
FIG. 4 is a second structural diagram of an apparatus for user registration according to an embodiment of the present application.

FIG. 4 is a second structural diagram of an apparatus for user registration according to an embodiment of the present application. The difference between FIG. 4 and FIG. 3 is that the apparatus in FIG. 4 further includes:

a second extraction module 350, configured for, after obtaining a service instruction voice of a user each time, extracting and storing a second voiceprint feature corresponding to the service instruction voice;

a first determination module 360, configured for determining a service type corresponding to the service instruction voice;

a first matching module 370, configured for matching the second voiceprint feature with each first voiceprint feature in each of the at least one category;

a second storage module 380, configured for storing a category identifier of a successfully matched first voiceprint feature in correspondence to this service type.

Further, the first determining module 360 includes:

a first identification unit, configured for identifying the service instruction voice to obtain service instruction voice identification information;

an analysis unit, configured for performing semantic analysis on the service instruction voice identification information;

a first determination unit, configured for determining the service type corresponding to the service instruction voice based on a result of the semantic analysis.

Further, the apparatus further includes:

a second determination module 390, configured for, after extracting the first voiceprint feature corresponding to the wake-up voice, determining the first voiceprint feature corresponding to the wake-up voice as a to-be-identified voiceprint feature;

a second matching module 3100, configured for matching the to-be-identified voiceprint feature with each first voiceprint feature in each of the at least one category;

a third determination module 3110, configured for determining a category identifier corresponding to a successfully matched first voiceprint feature as a target category identifier;

a judgment module 3120, configured for determining whether a service type that is stored in correspondence to the target category identifier exists; and a first output module 3130, configured for, when the judgment module determines that a service type that is stored in correspondence to the target category identifier exists, outputting service prompt information corresponding to the stored service type.

Further, the apparatus further includes:

a second output module, configured for outputting a request for requesting a first user identifier based on the identified target category identifier;

a first identification module, configured for receiving first voice information fed back by the user for the request for requesting the first user identifier, and performing voice identification on the first voice information to obtain first voice identification information;

a fourth determination module, configured for determining the first voice identification information as the first user identifier;

a record module, configured for recording a correspondence between the first user identifier and the target category identifier.

Further, the apparatus further includes:

a second output module, configured for, after obtaining a user registration instruction, acquiring a wake-up voice sample for N times in succession to obtain N wake-up voice samples, and outputting a request for requesting a second user identifier, wherein, N is an integer greater than 1;

a second identification module, configured for receiving voice information fed back by the user for the request for requesting the second user identifier, and performing voice identification on the voice information to obtain voice identification information corresponding to the voice information; and a third storage module, configured for determining the voice identification information as the second user identifier, and storing the second user identifier in correspondence to voiceprint features of the obtained N wake-up voice samples, respectively.

Further, the electronic device is an intelligent device; and the apparatus further includes:

a first obtaining module, configured for obtaining the wake-up voice of the user; wherein, the first obtaining module includes:

a detection unit, configured for detecting voice information in real time;

a second determination unit, configured for, after detecting voice information input by a user, when a silence duration reaches a preset voice pause duration, determining the voice information input by the user as target to-be-identified voice information;

a second identification unit, configured for performing voice identification on the target to-be-identified voice information to obtain target voice identification information; and a third determination unit, configured for, when the target voice identification information is the same as a preset wake-up word, determining the target to-be-identified voice information as the wake-up voice.

Further, the electronic device is a cloud server that is communicatively connected to the intelligent device;

the apparatus further includes:

a first obtaining module, configured for obtaining the wake-up voice of the user; wherein, the first obtaining module is further configured for receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

Figure 5:
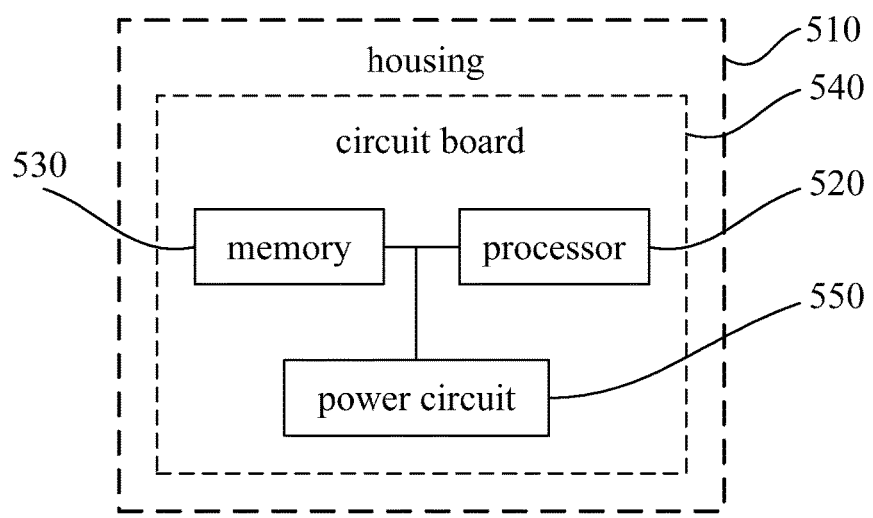
FIG. 5 is a structural diagram of an electronic device according to an embodiment of the present application.

Corresponding to the above embodiment of the method, an embodiment of the present invention further provides an electronic device. FIG. 5 is a structural diagram of an electronic device according to an embodiment of the present application. The electronic device includes:

a housing 510, a processor 520, a memory 530, a circuit board 540 and a power circuit 550; wherein, the circuit board 540 is arranged inside space surrounded by the housing 510; the processor 520 and the memory 530 are arranged on the circuit board 540; the power circuit 550 supplies power to each of circuits or components of the electronic device; the memory 530 stores executable program codes; the processor 520 executes a program corresponding to the executable program codes by reading the executable program codes stored in the memory, so as to perform the above method for user registration.

In an implementation, the above method for user registration may include:

after obtaining a wake-up voice of a user each time, extracting and storing a first voiceprint feature corresponding to the wake-up voice;

clustering the stored first voiceprint features to divide the stored first voiceprint features into at least one category, wherein, each of the at least one category comprises at least one first voiceprint feature, which belongs to the same user;

assigning one category identifier to each of the at least one category; and storing each category identifier in correspondence to at least one first voiceprint feature corresponding to this category identifier to complete user registration.

The other implementations of the above method for user registration refer to the description of the previous embodiment of the method, and will be not described herein again.

The specific process of the processor 520 executing the above steps and other implementations of the above method for user registration and the process executed by the processor 520 through the executable program codes, may refer to the description of embodiments shown in FIGS. 1-4, and will not be described herein.

It should be noted that the electronic device exists in various forms, including, but not limited to:

(1) mobile communication device: this type of device has mobile communication functions, and mainly aims at providing voice and data communication. This type of device includes an intelligent phone (e.g., iPhone), a multimedia phone, a functional phone, a low-end phone, and the like.

(2) ultra-mobile personal computer device: this type of device belongs to the category of personal computers, has computing and processing functions, and generally also has mobile network properties. This type of device includes PDA, MID, UMPC (e.g., iPad) and the like.

(3) portable entertainment device: this type of device may display and play multimedia contents. This type of device includes an audio and video player (e.g., iPod), a Portable Game Console, an eBook, an intelligent toy and portable onboard navigation device.

(4) server: the server is a device that provides computing services, and is composed of a processor, a hard disk, a RAM, a system bus and the like. The architecture of a server is similar to that of a general computer, but the server has relatively high requirements of processing capacity, stability, reliability, security, expandability, manageability and the like due to highly reliable service.

(5) other electronic devices that have a data interaction function.

It can be seen that, in the solution according to the embodiment of the present application, the processor of the electronic device executes the program corresponding to the executable program codes by reading the executable program codes stored in the memory, so as to cause the processor to: after obtaining a wake-up voice of a user each time, extract and store a first voiceprint feature corresponding to the wake-up voice; cluster the stored first voiceprint features to divide the stored first voiceprint features into at least one category, wherein, each of the at least one category includes at least one first voiceprint feature, which belongs to the same user; assign one category identifier to each category; store each category identifier in correspondence to at least one first voiceprint feature corresponding to this category identifier to complete user registration.

In embodiment of the present application, after a wake-up voice is received each time, a voiceprint feature is extracted and stored; the stored voiceprint features are clustered to divide the voiceprint features into at least one category, wherein each of the at least one category includes at least one voiceprint feature which belongs to the same user; a category identifier is assigned to each category; each category identifier is stored in correspondence to at least one voiceprint feature corresponding to the category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

The step of clustering the stored first voiceprint features to divide the stored first voiceprint features into at least one category may include:

calculating a similarity between every two of the stored first voiceprint features by a clustering algorithm; and dividing all of the first voiceprint features into at least one category based on the calculated similarities.

The above method may further include:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type.

The step of determining a service type corresponding to the service instruction voice may include:

identifying the service instruction voice to obtain service instruction voice identification information;

performing semantic analysis on the service instruction voice identification information; and determining the service type corresponding to the service instruction voice based on a result of the semantic analysis.

The above method may further include:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

The above method may further include:

outputting a request for requesting a first user identifier based on the identified target category identifier;

receiving first voice information fed back by the user for the request for requesting the first user identifier, and performing voice identification on the first voice information to obtain first voice identification information;

determining the first voice identification information as the first user identifier; and recording a correspondence between the first user identifier and the target category identifier.

The above method may further include:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user for the request for requesting the second user identifier, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

The above electronic device is an intelligent device; and the above method may further include:

obtaining the wake-up voice of the user by:

detecting voice information in real time;

after detecting voice information input by a user, when a silence duration reaches a preset voice pause duration, determining the voice information input by the user as target to-be-identified voice information;

performing voice identification on the target to-be-identified voice information to obtain target voice identification information; and when the target voice identification information is the same as a preset wake-up word, determining the target to-be-identified voice information as the wake-up voice.

The electronic device is a cloud server communicatively connected to an intelligent device; and the above method may further include:

obtaining the wake-up voice of the user by:

receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

An embodiment of the present invention further provides a computer readable storage medium. The computer readable storage medium stores a computer program therein. The computer program, when being executed by a processor, performs the following steps:

after obtaining a wake-up voice of a user each time, extracting and storing a first voiceprint feature corresponding to the wake-up voice;

clustering the stored first voiceprint features to divide the stored first voiceprint features into at least one category, wherein, each of the at least one category includes at least one first voiceprint feature, which belongs to the same user;

assigning one category identifier to each of the at least one category; and storing each category identifier in correspondence to at least one first voiceprint feature corresponding to this category identifier to complete user registration.

The other implementations of the above method for user registration refer to the description of the previous embodiment of the method, and will be not described herein again.

It can be seen that, in the solution according to the embodiment of the present invention, the computer program, when being executed by a processor, causes the processor to: after receiving a wake-up voice each time, extract and store a voiceprint feature; cluster the stored voiceprint features to divide the voiceprint features into at least one category; wherein each of the at least one category includes at least one voiceprint feature which belongs to the same user; assign one category identifier to each of the at least one category; store each category identifier in correspondence to at least one voiceprint feature corresponding to this category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

The step of clustering the stored first voiceprint features to divide the stored first voiceprint features into at least one category, may include:

calculating a similarity between every two of the stored first voiceprint features by a clustering algorithm; and dividing all of the first voiceprint features into at least one category based on the calculated similarities.

The above method may further include:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type.

The step determining a service type corresponding to the service instruction voice, may include:

identifying the service instruction voice to obtain service instruction voice identification information;

performing semantic analysis on the service instruction voice identification information; and determining the service type corresponding to the service instruction voice based on a result of the semantic analysis.

The above method may further include:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

The above method may further include:

outputting a request for requesting a first user identifier based on the identified target category identifier;

receiving first voice information fed back by the user for the request for requesting the first user identifier, and performing voice identification on the first voice information to obtain first voice identification information;

determining the first voice identification information as the first user identifier; and recording a correspondence between the first user identifier and the target category identifier.

The above method may further include:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user for the request for requesting the second user identifier, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

The above computer readable storage medium is a readable storage medium in an intelligent device; and the method may further include:

obtaining the wake-up voice of the user by:

detecting voice information in real time;

after detecting voice information input by a user, when a silence duration reaches a preset voice pause duration, determining the voice information input by the user as target to-be-identified voice information;

performing voice identification on the target to-be-identified voice information to obtain target voice identification information; and when the target voice identification information is the same as a preset wake-up word, determining the target to-be-identified voice information as the wake-up voice.

The above computer readable storage medium is a readable storage medium in a cloud server communicatively connected to an intelligent device; and the method may further include:

obtaining the wake-up voice of the user by:

receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

An embodiment of the present invention further provides an application program which, when being executed, performs the method for user registration according to the embodiment of the present application. The application program, when executed by the processor, causes the processor to perform the following steps:

after obtaining a wake-up voice of a user each time, extracting and storing a first voiceprint feature corresponding to the wake-up voice;

clustering the stored first voiceprint features to divide the stored first voiceprint features into at least one category, wherein, each of the at least one category includes at least one first voiceprint feature, which belongs to the same user;

assigning one category identifier to each of the at least one category; and storing each category identifier in correspondence to at least one first voiceprint feature corresponding to this category identifier to complete user registration.

The other implementations of the above method for user registration refer to the description of the previous embodiment of the method, and will be not described herein again.

It can be seen that, in the solution according to the embodiment of the present invention, the application program, when being executed by a processor, causes the processor to: after receiving a wake-up voice each time, extract and store a voiceprint feature; cluster the stored voiceprint features to divide the voiceprint features into at least one category, wherein each of the at least one category includes at least one voiceprint feature, which belongs to the same user; assign one category identifier to each category; store each category identifier in correspondence to at least one voiceprint feature corresponding to this category identifier to complete user registration. As aforementioned, in the prior art, only after a user continuously sends multiple wake-up voices and inputs a username to a voiceprint feature identification device to complete a registration, the voiceprint feature identification device can identify the user sending a voice. However, in the embodiment of the present application, it is not necessary to do this as in the prior art. Therefore, the embodiment of the present application can simplify the user operation and improve the user experience.

The step of clustering the stored first voiceprint features to divide the stored first voiceprint features into at least one category, may include:

calculating a similarity between every two of the stored first voiceprint features by a clustering algorithm; and dividing all of the first voiceprint features into at least one category based on the calculated similarities.

The above method may further include:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type.

The step of determining a service type corresponding to the service instruction voice, may include:

identifying the service instruction voice to obtain service instruction voice identification information;

performing semantic analysis on the service instruction voice identification information; and determining the service type corresponding to the service instruction voice based on a result of the semantic analysis.

The above method may further include:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

The above method may further include:

outputting a request for requesting a first user identifier based on the identified target category identifier;

receiving first voice information fed back by the user for the request for requesting the first user identifier, and performing voice identification on the first voice information to obtain first voice identification information;

determining the first voice identification information as the first user identifier; and recording a correspondence between the first user identifier and the target category identifier.

The above method may further include:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user for the request for requesting the second user identifier, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

The above application program is stored in an intelligent device and the above method may further include:

obtaining the wake-up voice of the user by:

detecting voice information in real time;

after detecting voice information input by a user, when a silence duration reaches a preset voice pause duration, determining the voice information input by the user as target to-be-identified voice information;

performing voice identification on the target to-be-identified voice information to obtain target voice identification information; and when the target voice identification information is the same as a preset wake-up word, determining the target to-be-identified voice information as the wake-up voice.

The above application program is stored in a cloud server communicatively connected to an intelligent device, and the above method may further include:

obtaining the wake-up voice of the user by:

receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

The embodiments of the apparatus, electronic device, computer readable storage medium, and application program are described briefly since they are substantially similar to the embodiment of the method. The related contents can refer to the description of the embodiment of the method.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The above described embodiments are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for user registration by means of a wake-up voice, which is applied to an electronic device, comprising:

after obtaining a wake-up voice of a user each time, extracting and storing a first voiceprint feature corresponding to the wake-up voice, wherein the wake-up voice is used for waking up the electronic device;

clustering the stored first voiceprint features to divide the stored first voiceprint features into at least one category, wherein, each of the at least one category comprises at least one first voiceprint feature, which belongs to the same user;

assigning one category identifier to each of the at least one category, wherein one user corresponds to one category identifier; and storing each category identifier in correspondence to at least one first voiceprint feature corresponding to this category identifier to complete user invisible registration;

wherein, clustering the stored first voiceprint features to divide the stored first voiceprint features into at least one category, comprises:

calculating a similarity between every two of the stored first voiceprint features by a clustering algorithm based on a similarity weight of each of to-be matched attributes of the stored first voiceprint features, wherein the attributes include at least one of a vibration frequency, a vibration period and amplitude of a sound wave spectrum; and dividing all of the first voiceprint features into at least one category based on the calculated similarities, wherein the method further comprises:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type;

wherein the method further comprises:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

2. The method of claim 1, wherein, determining a service type corresponding to the service instruction voice comprises:

identifying the service instruction voice to obtain service instruction voice identification information;

performing semantic analysis on the service instruction voice identification information; and determining the service type corresponding to the service instruction voice based on a result of the semantic analysis.

3. The method of claim 1, further comprising:

outputting a request for requesting a first user identifier based on the identified target category identifier;

receiving first voice information fed back by the user for the request for requesting the first user identifier, and performing voice identification on the first voice information to obtain first voice identification information;

determining the first voice identification information as the first user identifier; and recording a correspondence between the first user identifier and the target category identifier.

4. The method of claim 1, further comprising:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user for the request for requesting the second user identifier, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

5. The method of claim 1, wherein, the electronic device is an intelligent device, and the method further comprises:

obtaining the wake-up voice of the user by:

detecting voice information in real time;

after detecting voice information input by a user, when a silence duration reaches a preset voice pause duration, determining the voice information input by the user as target to-be-identified voice information;

performing voice identification on the target to-be-identified voice information to obtain target voice identification information; and when the target voice identification information is the same as a preset wake-up word, determining the target to-be-identified voice information as the wake-up voice.

6. The method of claim 1, wherein, the electronic device is a cloud server communicatively connected to an intelligent device; and the method further comprises:

obtaining the wake-up voice of the user by:

receiving a wake-up voice sent by the intelligent device; wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

7. A non-transitory computer readable storage medium for storing a computer program therein, wherein, the computer program, when being executed by a processor, causes the processor to perform the method for user registration of claim 1.

8. An electronic device, comprising: a housing, a processor, a memory, a circuit board and a power circuit; wherein, the circuit board is arranged inside space surrounded by the housing; the processor and the memory are arranged on the circuit board; the power circuit supplies power to each of circuits or components of the electronic device; the memory stores executable program codes; the processor executes a program corresponding to the executable program codes by reading the executable program codes stored in the memory, so as to cause the processor to perform operations of the following by means of a wake-up voice:

after obtaining a wake-up voice of a user each time, extracting and storing a first voiceprint feature corresponding to the wake-up voice, wherein the wake-up voice is used for waking up the electronic device;

clustering the stored first voiceprint features to divide the stored first voiceprint features into at least one category, wherein, each of the at least one category comprises at least one first voiceprint feature, which belongs to the same user;

assigning one category identifier to each of the at least one category, wherein one user corresponds to one category identifier; and storing each category identifier in correspondence to at least one first voiceprint feature corresponding to this category identifier to complete user invisible registration;

wherein, clustering the stored first voiceprint features to divide the stored first voiceprint features into at least one category, comprises:

calculating a similarity between every two of the stored first voiceprint features by a clustering algorithm based on a similarity weight of each of to-be matched attributes of the stored first voiceprint features, wherein the attributes include at least one of a vibration frequency, a vibration period and amplitude of a sound wave spectrum; and dividing all of the first voiceprint features into at least one category based on the calculated similarities, wherein, the processor is further caused to perform operations of:

after obtaining a service instruction voice of a user each time, extracting and storing a second voiceprint feature corresponding to the service instruction voice;

determining a service type corresponding to the service instruction voice;

matching the second voiceprint feature with each first voiceprint feature in each of the at least one category; and storing a category identifier of a successfully matched first voiceprint feature in correspondence to this service type;

wherein, the processor is further caused to perform operations of:

after extracting the first voiceprint feature corresponding to the wake-up voice, determining the first voiceprint feature corresponding to the wake-up voice as a to-be-identified voiceprint feature;

matching the to-be-identified voiceprint feature with each first voiceprint feature in each of the at least one category;

determining a category identifier corresponding to a successfully matched first voiceprint feature as a target category identifier;

determining whether a service type that is stored in correspondence to the target category identifier exists; and if a service type that is stored in correspondence to the target category identifier exists, outputting service prompt information corresponding to the stored service type.

9. The electronic device of claim 8, wherein, the processor is further caused to perform operations of:

identifying the service instruction voice to obtain service instruction voice identification information;

performing semantic analysis on the service instruction voice identification information; and determining the service type corresponding to the service instruction voice based on a result of the semantic analysis.

10. The electronic device of claim 8, wherein, the processor is further caused to perform operations of:

outputting a request for requesting a first user identifier based on the identified target category identifier;

receiving first voice information fed back by the user for the request for requesting the first user identifier, and performing voice identification on the first voice information to obtain first voice identification information;

determining the first voice identification information as the first user identifier; and recording a correspondence between the first user identifier and the target category identifier.

11. The electronic device of claim 8, wherein, the processor is further caused to perform operations of:

after obtaining a user registration instruction, acquiring a wake-up voice sample for N times in succession to obtain N wake-up voice samples, and outputting a request for requesting a second user identifier, wherein, N is an integer greater than 1;

receiving voice information fed back by the user for the request for requesting the second user identifier, and performing voice identification on the voice information to obtain voice identification information corresponding to the voice information; and determining the voice identification information as the second user identifier, and storing the second user identifier in correspondence to voiceprint features of the obtained N wake-up voice samples, respectively.

12. The electronic device of claim 8, wherein, the electronic device is an intelligent device, and the processor is further caused to perform an operation of:

obtaining the wake-up voice of the user by:
detecting voice information in real time;
after detecting voice information input by a user, when a silence duration reaches a preset voice pause duration, determining the voice information input by the user as target to-be-identified voice information;
performing voice identification on the target to-be-identified voice information to obtain target voice identification information; and
when the target voice identification information is the same as a preset wake-up word, determining the target to-be-identified voice information as the wake-up voice.

13. The electronic device of claim 8, wherein, the electronic device is a cloud server communicatively connected to an intelligent device; and the processor is further caused to perform an operation of:
obtaining the wake-up voice of the user by:
receiving a wake-up voice sent by the intelligent device;
wherein, after detecting voice information input by a user, when a silence duration reaches a preset voice pause duration, the intelligent device determines the voice information input by the user as target to-be-identified voice information; performs voice identification on the target to-be-identified voice information to obtain target voice identification information; determines the target to-be-identified voice information as the wake-up voice when the target voice identification information is the same as a preset wake-up word; and sends the wake-up voice to the cloud server.

* * * * *